United States Patent [19]

Diggs

[11] 3,970,917

[45] July 20, 1976

[54] SYSTEM FOR ENERGY STORAGE AND DC TO AC CONVERSION

[76] Inventor: Richard E. Diggs, P.O. Box 776, Carthage, Mo. 64836

[22] Filed: July 16, 1975

[21] Appl. No.: 596,302

[52] U.S. Cl. ................................. 322/4; 74/572; 290/1 R; 310/74
[51] Int. Cl.² ..................... H02K 7/02; F16F 15/30
[58] Field of Search .................. 310/40, 74; 322/4; 320/61; 290/1; 74/572; 280/217; 318/150, 161

[56] References Cited
UNITED STATES PATENTS

| | | | |
|---|---|---|---|
| 554,138 | 2/1896 | Negbaur et al. .................. | 74/542 X |
| 3,497,026 | 2/1970 | Calvert .............................. | 322/4 X |
| 3,518,469 | 6/1970 | Storsand ............................ | 310/74 |

Primary Examiner—J D Miller
Assistant Examiner—Robert J. Hickey
Attorney, Agent, or Firm—Oblon, Fisher, Spivak, McClelland & Maier

[57] ABSTRACT

A system is disclosed for storing electrical energy and for converting DC power to AC power. The system includes a very large flywheel which is mounted in an evacuated housing and is driven by a plurality of wheels powered by DC electric motors which receive current from an input power source. An independent plurality of wheels coupled to AC generators selectively engage the rotating flywheel to withdraw energy from the rotating mass of the flywheel in the form of alternating current. Control systems are provided for adjusting the radial position of the drive and output wheels in dependence upon the speed of the flywheel. Additional control systems are provided to change the number of driving motors or output generators in contact with the flywheel depending upon the input power available or output power required.

11 Claims, 8 Drawing Figures

SYSTEM FOR ENERGY STORAGE AND DC TO AC CONVERSION

BACKGROUND OF THE INVENTION

1. Field of the Invention

The present invention relates generally to energy storage and conversion systems, and more particularly to a system for storing electrical energy in the form of rotational momentum and for converting direct current power into alternating current power using a rotating mass as a buffer.

2. Description of the Prior Art

A need exists for inexpensive and reliable techniques for storing large amounts of electrical energy. Several techniques have been developed in the past, but many of these solutions are not practical in many environments. For example, systems have been developed in which excess electrical power is used to drive pumps which pump water into large storage facilities. When additional power is needed, the water from the storage facilities is drawn out through turbine wheels which convert the potential energy of the stored water into electrical energy. Although such systems work well in environments where large quantities of water are readily available, they are not practical in many parts of the country where water is not readily available and where the land is often flat, making the construction of elevated reservoirs extremely difficult and complex. Furthermore, water storage systems of the type described are generally feasible only for very large power stations since they are very expensive and complex to construct.

Energy storage devices are needed throughout the world for use in conjunction with many of the energy generating techniques which have been popularized by the recent shortage of fossil fuels. For example, there is now considerable interest in generating electrical power using naturally available sources of energy such as wind energy, solar energy, geothermal energy and others. Many of these sources such as wind energy and solar energy are discontinuous in a time frame which is often not compatable with output power requirements. For example, no solar energy is available at night when there is a need for output power to drive lighting fixtures.

Thus there is a need to accumulate the energy derived from discontinuous natural sources of this type until a need for the energy develops. Naturally, such systems which remove energy from nature at no cost and store it until a need for the energy arises can be of great economic and commercial importance as the cost of fossil fuels and other techniques of generating energy increase dramatically.

It is also desirable that an energy storage apparatus for use in conjunction with energy sources of the type described be capable of converting direct current power into alternating current power since it is often easiest to convert some forms of natural energy, such as solar energy, into direct current, while most commercial appliances require alternating current power. Thus it is highly desirable that the energy storage means, in addition to providing a temporary storage function, also provide the capability of converting from direct to alternating current power.

SUMMARY OF THE INVENTION

Accordingly, it is one object of the present invention to provide a system for temporarily storing electrical energy.

A further object of the present invention is the provision of a novel system of relatively low cost for providing temporary storage of electrical power.

A still further object of the present invention is the provision of a novel system for storing electrical power in the form of angular momentum.

Yet another object of the present invention is an apparatus for temporarily storing electrical energy and for permitting conversion from direct current to alternating current power.

A still further object of the present invention is the provision of a novel system for driving a massive flywheel using electrical energy and for retrieving electrical energy in a different form from the flywheel.

A still further object of the present invention is the provision of a novel control system for operating a device for storing energy in the form of angular momentum and for retrieving the stored energy.

Briefly, these and other objects of the invention are achieved by providing a plurality of adjustably positionable drive wheels driven by direct current to accelerate a massive flywheel. A similar plurality of adjustably positionable driven wheels engage and are driven by the flywheel to turn alternating current generators for producing output power. Unused power is stored as angular momentum in the rotating flywheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
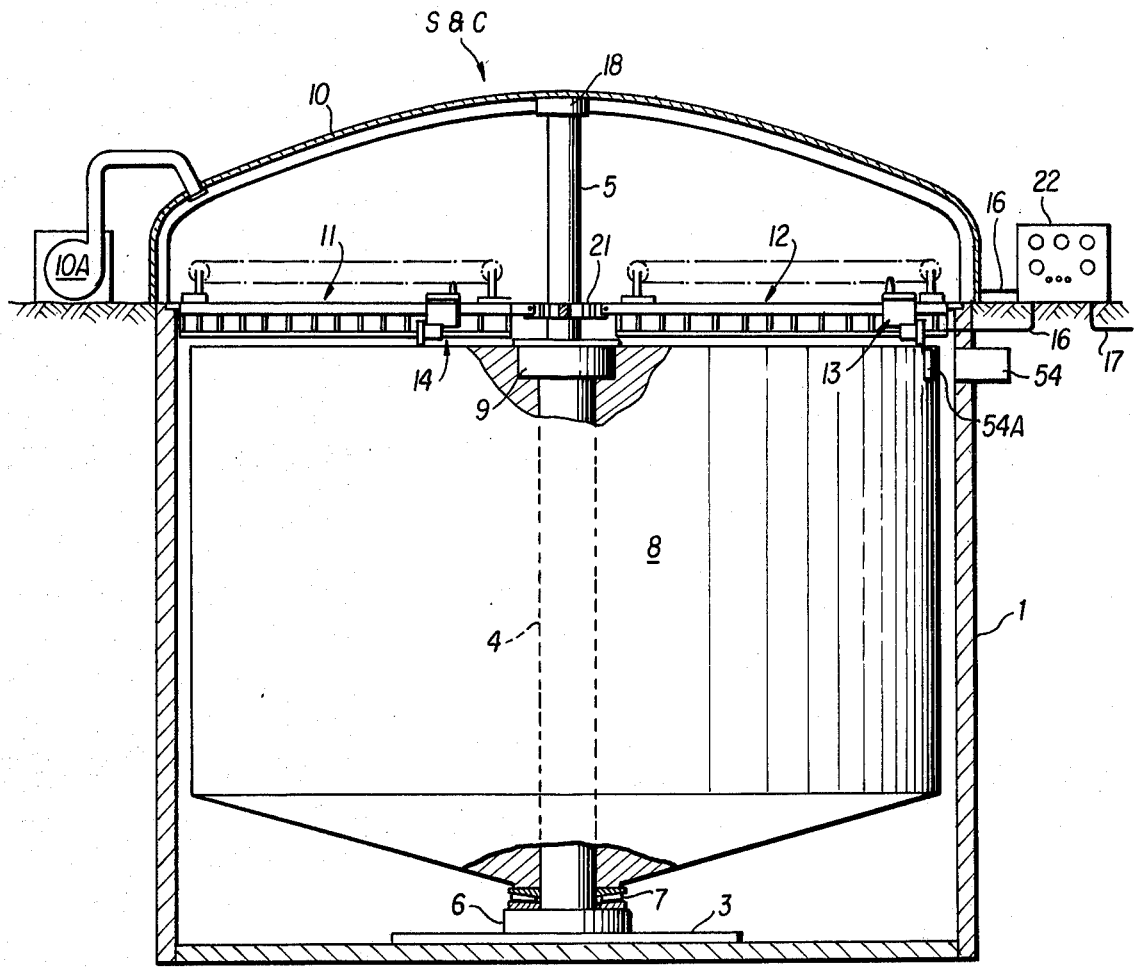
FIG. 1 is a cross-sectional side elevation of the flywheel apparatus of the present invention.

Referring now to the drawings, wherein like reference numerals designate identical or corresponding parts throughout the several views, and more particularly to FIG. 1 thereof, the basic electromechanical apparatus of the present invention is illustrated. A pit or container wall which may be formed of concrete, steel or any other suitable material is shown surrounding the apparatus of the invention. A pit or container floor 2, which may be formed of the same material as the wall 1, supports a flanged pedestal mount 3. It will be noted that the container structure can be sunk into the ground in the form of a pit, or it can be constructed entirely above the ground as circumstances warrant.

A heavy main riser column 4 is secured to the flanged pedestal mount 3 and has an extended top member 5 of reduced diameter projecting as an extension from the upper end thereof. A thrust block 6 is positioned around the lower end of the main riser column 4 where it is supported by the flanged pedestal mount 3 for retaining the main riser column in position. Thrust bearings 7 are provided for rotatably mounting a very large flywheel 8 carried by the column 4.

The flywheel 8 is secured to the shaft 4 which is supported at its upper end by bearings 9, and may be formed of reinforced concrete, cast iron or other suitable materials capable of withstanding large centrifugal forces. The flywheel 8 is preferably a very large unit weighing between 200 and 300 tons, enabling it to store large quantities of energy, for example between 990 thousand and 5 million horsepower hours. Clearly, these figures are only exemplary, and the apparatus of the present invention can be built on much smaller and much larger scales than those described.

A vacuum tight cover 10 is provided for entirely sealing the open top of the pit containing the flywheel 8 so that the flywheel may be operated in a vacuum to reduce frictional power losses. A conventional vacuum pump 10A is preferably provided for maintaining the vacuum within the flywheel chamber.

A driver wheel frame 11 and a generator wheel frame 12 are illustrated positioned parallel to the top surface of flywheel 8 and secured at the outer radial ends thereof to the pit wall 1 and at the inner ends thereof to a mounting collar 21 resting on a shoulder 21a formed where top member 5 joins main riser column 4. The details of the wheel frames 11 and 12 are illustrated more clearly in FIG. 2 which is a top view of the structure illustrated in FIG. 1.

Figure 2:
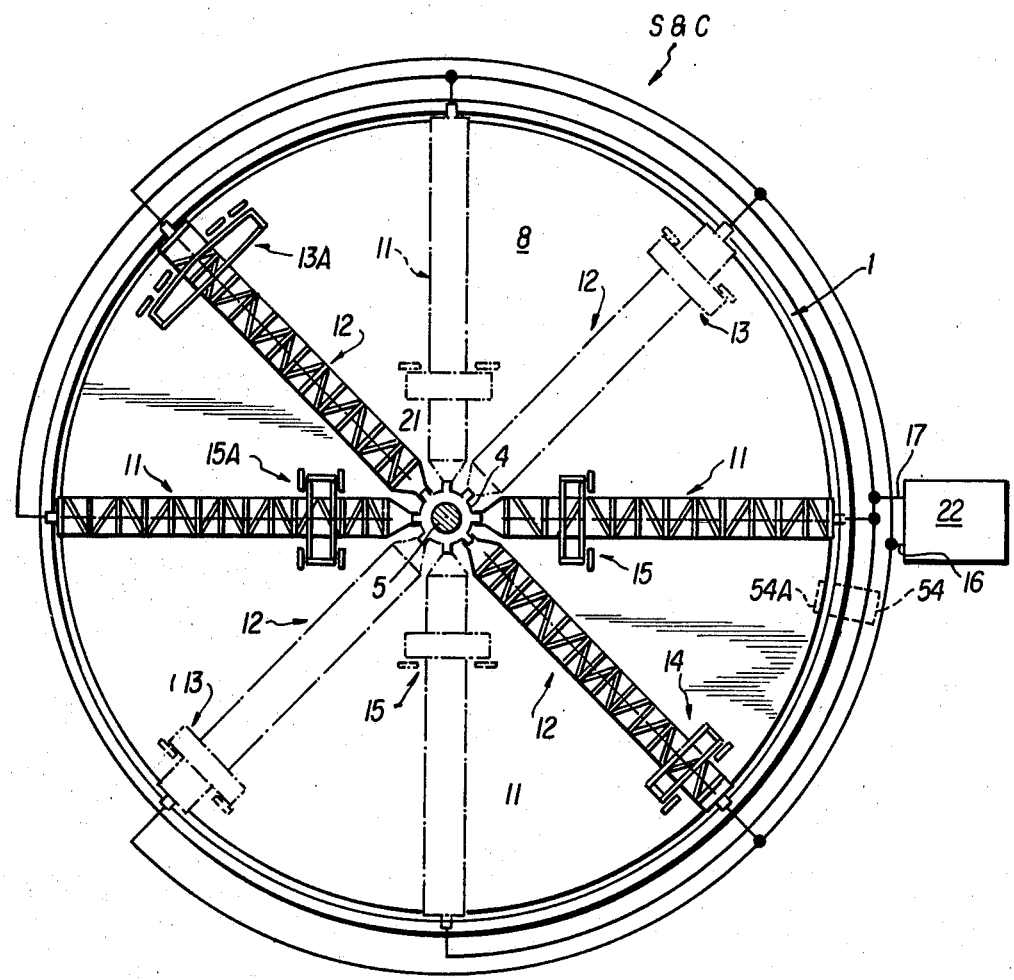
FIG. 2 is a top view of the flywheel apparatus illustrated in FIG. 1 showing further details of the drive and generator wheel structure of the present invention.

Referring now to FIG. 2 it is seen that there are four driver wheel frame members 11 arranged in a cross-like pattern, and also four generator wheel frames 12 similarly arranged and positioned symmetrically between the driver wheel frames. All wheel frames are secured between the pit wall 1 and the mounting collar 21 so that they are rigidly positioned above the flywheel 8 and possess the structural strength to permit large accelerating and decelerating forces to be applied to the flywheel 8. A generator wheel assembly 13 is carried by each generator wheel frame 12 and a similar drive wheel assembly 15 is carried by each drive wheel frame 11. For heavy duty or high power applications, double or multiple drive wheel assemblies as shown at 15A may be used, and similarly double or multiple generator wheel assemblies 13A can be added to the system. DC power lines 16 are coupled through a control panel 22 to each of the drive wheel frames 11 for supplying driving power to the various drive wheel assemblies 15. AC output power lines 17 are similarly coupled to the generator wheel assemblies 13 and the generator wheel frames 12 for carrying output power produced by the generators through the control panel 22 to external loads.

Figure 5:
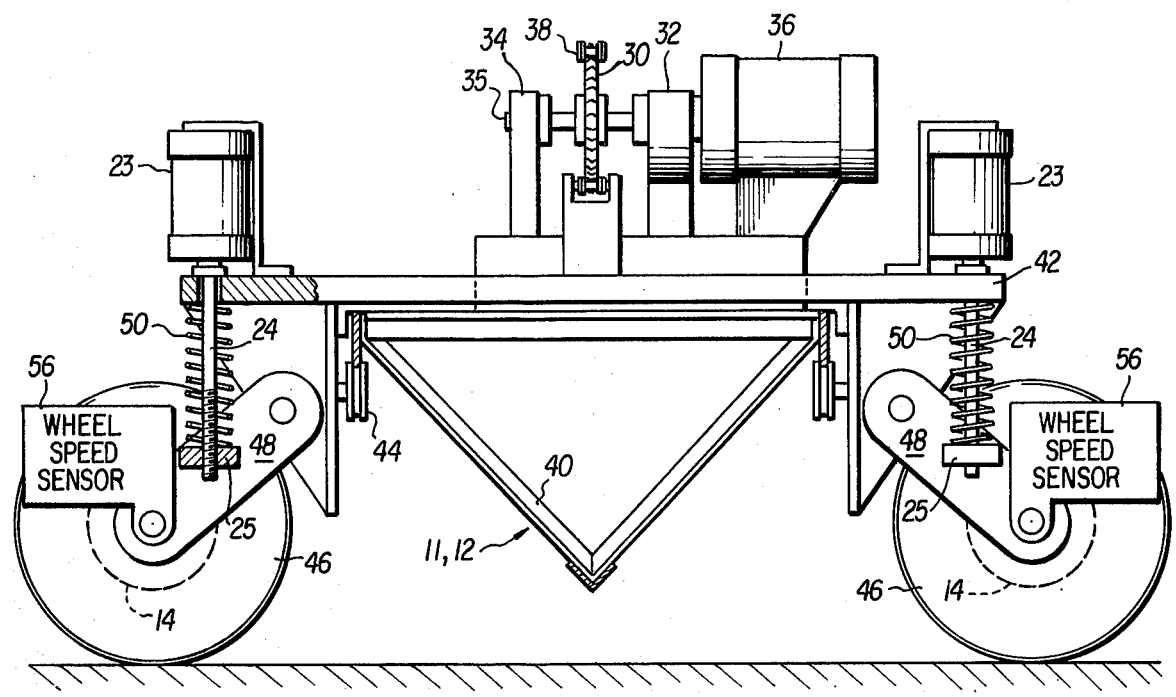
FIG. 5 is a side elevational view of a drive wheel apparatus showing the frame structure thereof.
Figure 6:
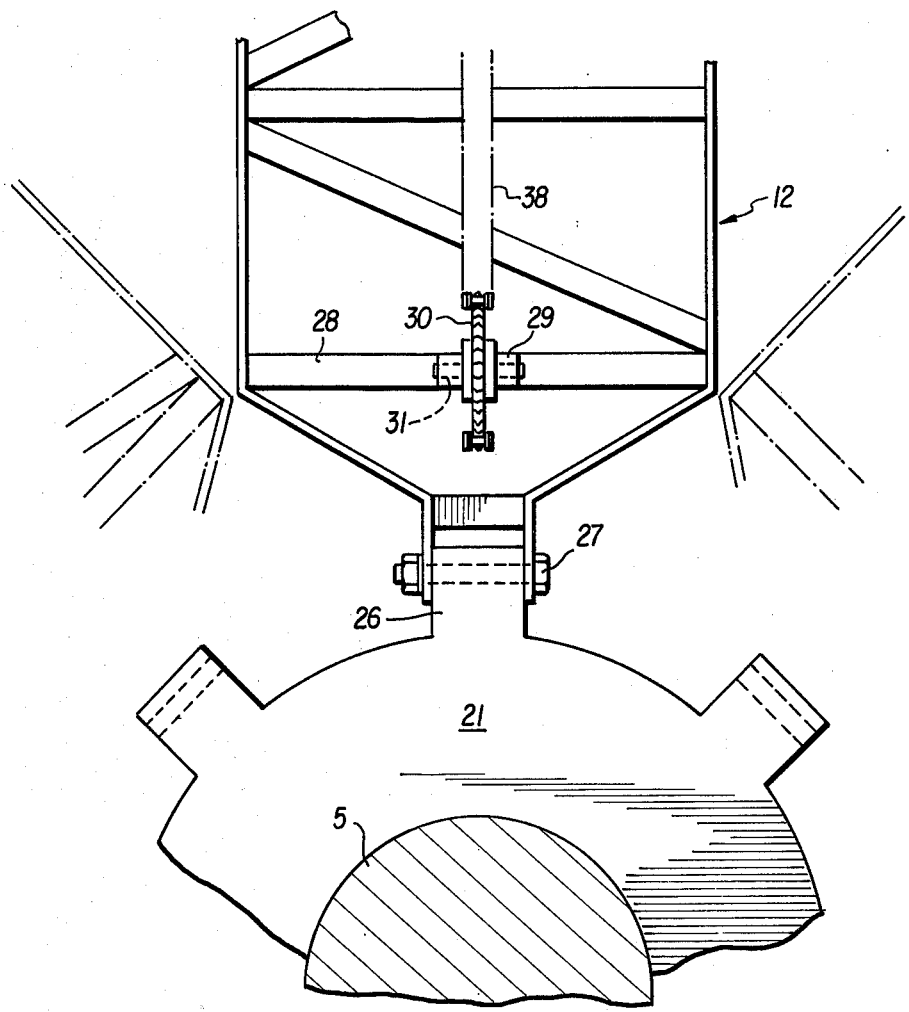
FIG. 6 is a sectional top view of a portion of the wheel moving mechanism of the present invention.
Figure 7:
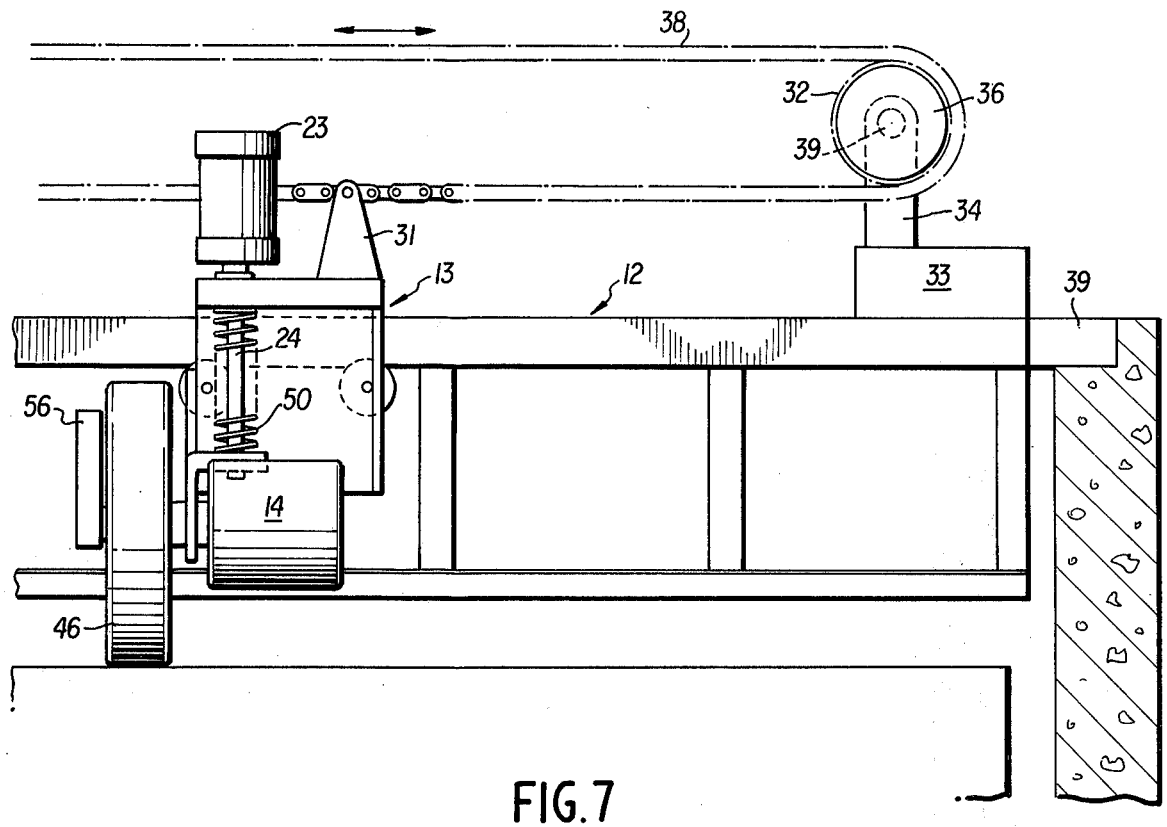
FIG. 7 is a partial side view of the wheel moving mechanism of the present invention showing details thereof.

Attention is now directed to FIGS. 5-7 which illustrate the details of the wheel frames 11 and 12 and the wheel assemblies 13 and 15. It will be noted that the mechanical structures and configurations of the drive wheel frames and the generator wheel frames are preferably identical for economy of manufacture. Similarly, the generator wheel assemblies and the drive wheel assemblies are preferably identical. Naturally, the electrical equipment, and specifically the DC drive motors and AC generators are different from one another.

Referring now to FIG 5, an end view of one of the wheel assemblies and its driving components is illustrated. A triangular frame 40 of bridge-type construction is shown as forming the central rigid structure of the wheel frames 11 and 12. A wheel carriage 42 is slidably mounted by means of appropriate roller bearings 44 and associated guide tracks for free longitudinal movement along the triangular frame 40. The basic structural details of the triangular frame 40, the wheel carriage 42 and the roller bearing assemblies 44 are disclosed in more detail in my co-pending application Ser. No. 576,984 filed May 13, 1975. At least a pair of wheels 46 are pivotably mounted to the wheel carriage 42 by means of suitable support arms 48. Each wheel is provided with an indexing motor 23 which permits selective raising and lowering of each wheel 46 by rotating a screw 24 which cooperates with an internally threaded wheel control bracket 25, one of which is secured to each of the support arms 48. A shock absorbing and tensioning spring 50 is positioned around the screw 24 to maintain the wheels 46 in firm engagement with the surface of the flywheel 8.

An electric motor 14 (or a corresponding generator) is coupled to the axle of each wheel 46 for driving or being driven by the wheel. In the case of the DC drive wheels, DC motors are coupled to the axle of each wheel for supplying power to the wheel whereby the flywheel 8 is rotated. In the case of the generator wheels, a generator is coupled to the axle of each wheel 46 for being driven by the wheel 46 to remove energy from the flywheel 8.

The mechanism for moving the wheel carriage 42 radially along the top surface of the flywheel 8 is also illustrated in FIG. 5 and includes a bracket 33 securely mounted to the triangular frame 40. On the bracket is mounted a chain sprocket 30 carrying a chain 38, and supported by means of a shaft 35 rotatably mounted in a bearing ear 34. The sprocket 30 is driven through a gear assembly contained in a housing 32 and coupled to the shaft 34. The gear assembly is driven by an indexing motor 36 mounted, along with the gear housing 32 to the bracket 33. A drag link 37 is secured to the wheel carriage 42 and to the chain 38 for coupling the wheel carriage assembly with the chain and its driving mechanism.

A side view of the apparatus illustrated in FIG. 5 is shown in FIG. 7, further illustrating the manner in which the wheel carriage 42 slides along the triangular frame 40 under control of the drive assembly acting through the chain 38. As shown in FIG. 7, a pin frame 39 is secured to one end of the triangular frame and provides a means of securing the triangular frame to the pit wall 1 of the overall structure as illustrated in FIG. 1. The pin frame 39 preferably includes an interior slot (not shown) in which a corresponding support member rigidly fixed to the pit wall 1 may fit. A heavy duty cotter pin is then inserted through the cooperating members to removably mount the triangular frame 40 to the pit wall.

FIG. 6 illustrates a top view of the interior end of each of the wheel frames 11 and 12 showing the manner in which the wheel frames are coupled to the top member 5. As shown in FIG. 6, the frame 40 includes an aperture at the end portion thereof for accommodating a bracket frame mount 26 secured to the column top stem member 5 of main riser column 4. A heavy duty cotter pin 27 in inserted through these corresponding members to removably secure each of the triangular frames 40 to the central mounting collar 21. An idler sprocket 30A, maintained in position by a suitable bracket 29 and pin 31, is mounted to the triangular frame 40 for supporting the non-driven end of chain 38.

Figure 3:
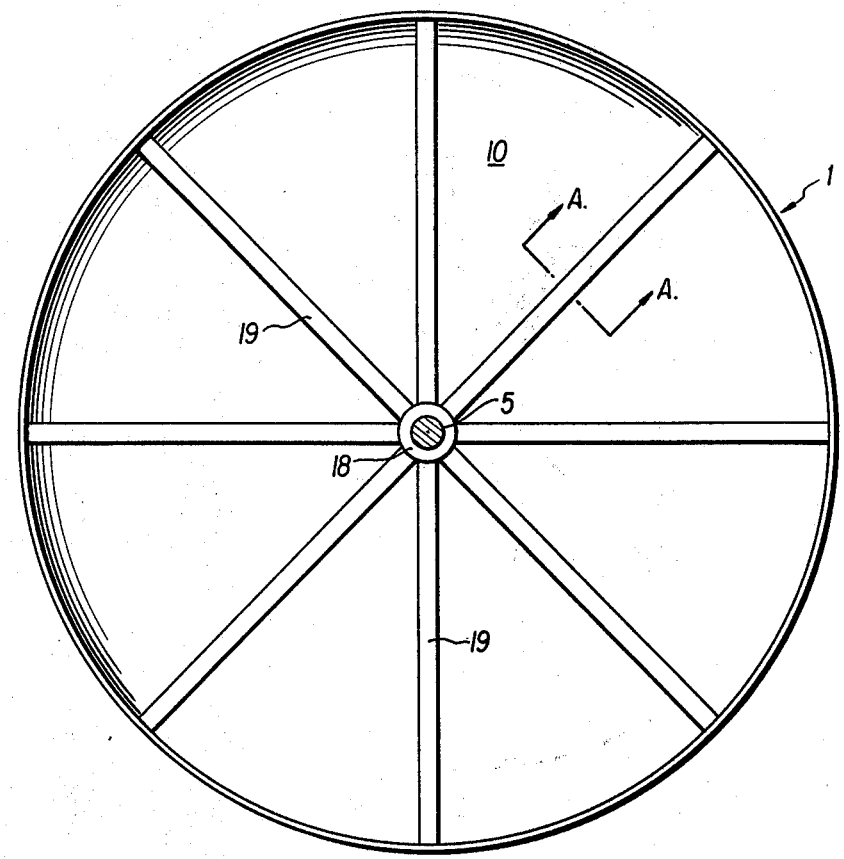
FIG. 3 is a plan view of the lower surface of the vacuum-tight cover for the flywheel apparatus illustrated in FIG. 1.
Figure 4:
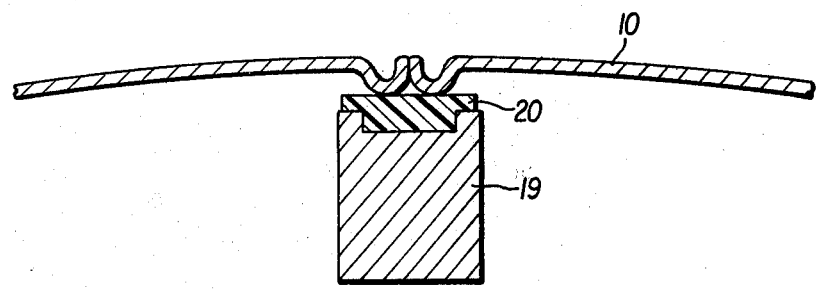
FIG. 4 is an enlarged cut-away side view of a portion of the structure illustrated in FIG. 3 showing the details of a joint thereof.

Attention is now directed to FIGS. 3 and 4 which illustrate in more detail the structure of the cover panel 10. The cover panel 10 is preferably divided into a number of segments, of which 8 are shown. Naturally, a larger or smaller number of segments may be used depending upon the size of the overall assembly. Each of the illustrated segments is supported at its edge portion by a sturdy frame member 19, such as a steel girder for example, as shown in FIG. 4. A resilient sealing gasket 20 is positioned along the top surface of the support girder 19 and is partially inserted into a retaining groove 20A. Each of the individual panels 10, which may be constructed of glass, fiberglass, steel or any other equivalent material includes a channel-shaped end portion 10A which is adapted to be positioned over the portion of the gasket 20 seated in the channel 20A. The weight of each panel 10 presses into the gasket 20 providing an air-tight seal. When a vacuum is created within the flywheel chamber, atmospheric pressure forces the channel portions 10A of each panel 10 deeper into the gasket material creating an ever-tightening seal.

Figure 8:
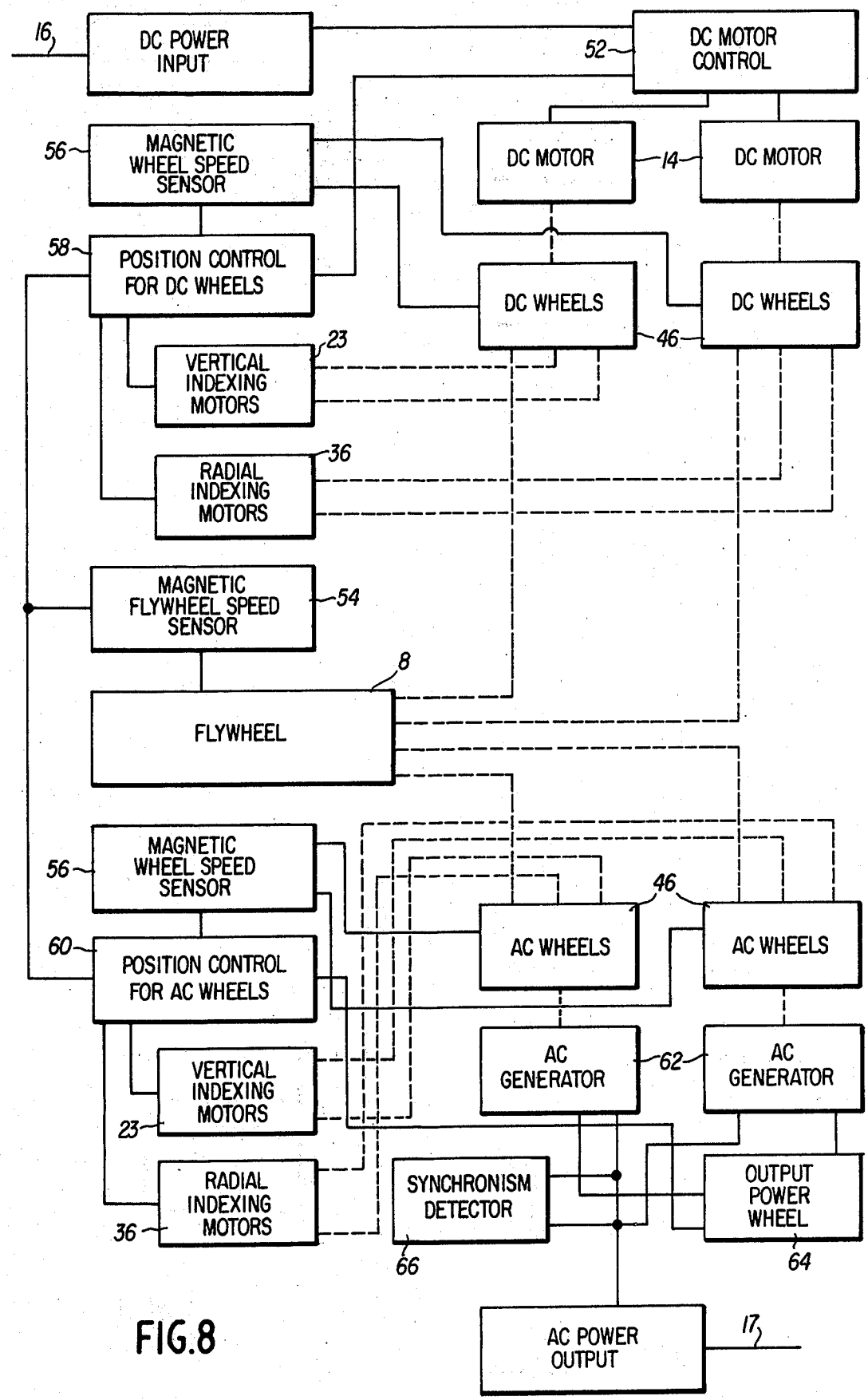
FIG. 8 is a block diagram illustrating the control system of the present invention.

Reference is now directed to FIG. 8 wherein the control system of the present invention is illustrated in the form of a block diagram. All of the components illustrated in FIG. 8 are conventional electronic or electrical devices which are easily commercially available, as will be understood by those skilled in the art. Thus, none of the individual components illustrated comprises an aspect of the present invention. However, the combined system illustrated in FIG. 8 which accomplishes the necessary controls for operating the apparatus of the present invention is considered a unique aspect of the invention.

A DC power input line 16 is shown for supplying the input energy to the system. The input power is supplied to a DC motor control 52 which distributes the input power to DC motors 14 which drive their associated DC drive wheels which mechanically engage the flywheel 8 for accelerating the flywheel. The amount of input power is measured by the DC motor control 52 for determining how many of the individual DC drive motors need be energized to efficiently transfer the amount of input power to the flywheel 8. If a large input power is supplied over line 16, the motor controller energizes a maximum number of individual DC drive motors for driving as many of the DC drive wheels as possible in order to provide a maximum acceleration to the flywheel 8 and to build its speed rapidly to store the large flux of input power. Conversely, only a small input power is received, a minimum number of drive motors are energized to accelerate the flywheel more slowly, thereby storing only the smaller amount of power being supplied.

As the flywheel 8 is accelerated, a magnetic flywheel speed sensor 54 monitors the speed of the flywheel by sensing the passage of magnetic inserts 54A carried by the fly heel, and supplies this information to a position control 58 for the DC drive wheels and to a position control 60 for AC generator wheels. The position control also receives speed signals from the individual DC drive wheels through magnetic wheel speed sensors 56 associated with each wheel. In response to these wheel speed signals, the position control supplies appropriate indexing signals to the vertical indexing motors 23 and the radial indexing motors 36. The vertical indexing motors 23 raise and lower the various wheels to place them in contact with the flywheel or remove them from contact with it, while the radial indexing motors move the wheels along the radius of the flywheel. The position control is synchronized with the DC motor control 52 so that as a first pair of wheels is accelerated to a selected maximum desirable speed, the position control energizes the vertical indexing motors to place a second pair of drive wheels in contact with the flywheel at the same time that the DC motor control supplies power to the motor driving the additional wheels. Similarly, when the wheel speed sensors indicate that the wheels are turning at a maximum desirable rate for a given flywheel speed, and yet additional power is being received to accelerate the flywheel, the position control energizes the radial indexing motors to move the drive wheels toward the center of the flywheel so that the flywheel speed can be accelerated for a given speed of the drive wheels. Thus, the position control selectively moves the drive wheels along the radius of the flywheel for maintaining efficient wheel speeds for accelerating the flywheel, and also controls the number of drive wheels engaging the flywheel.

A similar arrangement is provided for controlling the AC generator wheels and the AC generators 62 driven by them. An AC generator wheel position control 60 controls vertical indexing motors 23 and radial indexing motors 36 in accordance with signals developed by magnetic wheel speed sensors 56, magnetic flywheel speed sensor 54 and output power control 64. The wheel speed and flywheel speed signals together with the control signal from the output power control 64 are used to control the position and number of AC wheels being driven by the flywheel at a given interval. The power control 64 monitors the load power consumption in conjunction with the speed of the operating AC generator wheels. If more power is needed to adequately supply the load, the position control is directed to energize additional vertical indexing motors 23 to cause more AC wheels to engage the flywheel 8 and thereby to generate more power. A synchronism detector 66 is coupled to all of the individual AC generators 62 to maintain all generators in synchronism for providing a uniform AC output.

To provide an example of normal operation, it is assumed that the flywheel 8 is initially at rest. A supply of DC current is then fed through the line 16 to the DC drive wheels. The DC drive wheels spin the flywheel up to a minimum rpm at which the AC generators will run at the proper speed to produce AC power of the desired frequency. Both the AC and DC wheels normally start near the outer periphery of the flywheel and are gradually moved toward the center of the device as the flywheel speed increases under the control of the various wheel positioning networks.

The system of the present invention is very efficient in operation and is easily assembled and serviced. The cover panels 10 may be easily removed for access to the main working components simply by reducing the vacuum within the flywheel chamber. Similarly, the individual wheel frames 11 and 12 may be readily removed simply by pulling the mounting pins which secure the ends of each frame in position. Wheel carriages can be readily removed and replaced as units with little difficulty. Similarly, drive wheel and generator wheel carriages can be replaced with carriages having greater numbers of wheels for increasing the power storage and output capacity of a given unit, as well as for increasing the response time of the unit.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An energy storage and conversion system comprising:
   a massive flywheel rotatably mounted within a housing;
   drive means coupled to said housing and positioned to selectively engage a surface of said flywheel for supplying power to said flywheel,
   driven means coupled to said housing and positioned to selectively engage a surface of said flywheel for withdrawing power from said flywheel,
   vertical control means coupled to said drive means and to said driven means for controlling engagement thereof with said flywheel; and,
   radial control means coupled to said drive means and to said driven means for adjusting the radial position at which said drive means and said driven means engage said flywheel.

2. A system as in claim 1, wherein said drive means comprises:
   a frame member,
   wheel carriage means mounted for longitudinal motion along said frame member,
   a plurality of drive wheels rotatably mounted on said wheel carriage; and,
   electric motor means coupled to said wheels for driving said wheels.

3. A system as in claim 2, wherein said drive means further comprises:
   indexing motor means mounted to said wheel carriage and coupled to said wheels for raising and lowering said wheels to permit selective engagement of said wheels and said flywheel.

4. A system as in claim 3, wherein said drive means further comprises:
   a chain coupled to said wheel carriage; and,
   chain driving means mounted to said frame member for powering said chain whereby said wheels are moved to engage said flywheel at different radial positions.

5. A system as in claim 1, wherein said driven means comprises:
   a radially adjustable support member,
   a plurality of wheels movably coupled to said support member,
   generator means coupled to said wheels to be rotated by said wheels.

6. A system as in claim 5, wherein said driven means further comprises:
   indexing motor means coupled to said wheels for selectively moving said wheels into and out of engagement with said flywheel.

7. A system as in claim 1 further comprising:
   cover panel means removably mounted to said housing for sealing said housing.

8. A system as in claim 7, further comprising:
   vacuum pump means coupled to said housing for evacuating the interior thereof for reducing frictional resistance to the rotation of said flywheel.

9. A system as in claim 7, wherein:
   said cover panel means comprises a frame having a resilient gasket material positioned thereon; and,
   a plurality of panel segments adapted to be positioned on said frame in engagement with said gasket material for providing an air tight seal therewith.

10. A system as in claim 1, wherein said vertical control means comprises:
    an input power monitoring circuit,
    a position controller coupled to said input power monitoring circuit,
    wheel speed sensor means coupled to said position controller for supplying wheel speed information thereto,
    flywheel speed sensor coupled to said position controller for supplying flywheel speed information thereof; and,
    vertical index motor means coupled to said drive means and said driven means for raising and lowering them.

11. A system as in claim 1, wherein said radial control means comprises:
    an input power monitoring circuit,
    a position controller coupled to said input power monitoring circuit,
    wheel speed sensor means coupled to said position controller for supplying wheel speed information thereto,
    flywheel speed sensor coupled to said position controller for supplying flywheel speed information thereto; and,
    radial index motor means coupled to said drive means and said driven means for adjusting the radial positions thereof with respect to said flywheel.

* * * * *